(12) United States Patent
Crippen et al.

(10) Patent No.: US 7,924,558 B2
(45) Date of Patent: Apr. 12, 2011

(54) INSERTION AND ROTATION CONNECTOR

(75) Inventors: Martin J. Crippen, Apex, NC (US);
Brian M. Kerrigan, Cary, NC (US);
Edward J. McNulty, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 39 days.

(21) Appl. No.: 12/550,474

(22) Filed: Aug. 31, 2009

(65) Prior Publication Data
US 2011/0051342 A1    Mar. 3, 2011

(51) Int. Cl.
*G06F 1/16* (2006.01)
(52) U.S. Cl. .............. 361/679.4; 345/419; 710/313; 711/165; 439/71
(58) Field of Classification Search .......... 711/6, 103, 711/115, 165; 439/78, 154, 55, 71; 710/68, 710/300, 301, 307, 313; 713/189, 194, 330; 365/193, 194; 345/418, 541, 419, 156, 621; 361/679.53, 679.32, 679.01, 679.48, 679.41, 361/679.27, 761, 801
See application file for complete search history.

(56) References Cited

U.S. PATENT DOCUMENTS

| | | | |
|---|---|---|---|
| 3,701,071 A | 10/1972 | Landman | |
| 4,657,320 A | 4/1987 | Bamford et al. | |
| 4,701,133 A | 10/1987 | Worth | |
| 4,715,819 A | 12/1987 | Iwasa et al. | |
| 4,863,388 A | 9/1989 | Reimer et al. | |
| 5,136,465 A * | 8/1992 | Benck et al. ............ | 361/679.31 |
| 5,704,793 A | 1/1998 | Stokoe et al. | |
| 6,004,142 A | 12/1999 | Wark | |
| 6,809,925 B2 * | 10/2004 | Belady et al. ............ | 361/679.48 |
| 6,822,878 B2 | 11/2004 | Dobbs et al. | |
| 6,896,548 B2 | 5/2005 | Scuteri et al. | |
| 7,372,702 B2 | 5/2008 | Gauche et al. | |
| 7,535,730 B2 * | 5/2009 | Junkins et al. ............ | 361/801 |
| 2008/0293264 A1 * | 11/2008 | Trout et al. ............ | 439/74 |

OTHER PUBLICATIONS

Kenneth Mason Publications Ltd, "Research Disclosure—27208 Surface Mounted Pivoting Card Edge Connector", Dec. 1986, No. 272, Kenneth Mason Publications Ltd, England, 1 page.

* cited by examiner

*Primary Examiner* — Hung V Duong
(74) *Attorney, Agent, or Firm* — Cynthia G. Seal; Jeffrey L. Streets

(57) ABSTRACT

One embodiment includes the provision of a novel insert-and-rotate connection for a daughter card, such as in a blade computer system. The daughter card has both a card edge with a plurality of card edge contacts and a mezzanine connector spaced from the card edge. An interposer mounted on the motherboard has a card edge connector and a midplane connector in communication with the card edge connector. The card edge connector includes a socket for receiving the card edge of the daughter card with the daughter card at an acute angle to the motherboard, to avoid interference between the mezzanine connector on the daughter card and a corresponding mezzanine connector on the motherboard. Once the card edge is inserted into the socket of the card edge connector, the socket allows for rotation of the daughter card about the received card edge. The mezzanine connectors are aligned for connection in response to rotation of the daughter card about the received card edge. The contacts on the card edge also contact the corresponding socket contacts in response to the rotation of the card.

13 Claims, 4 Drawing Sheets

INSERTION AND ROTATION CONNECTOR

BACKGROUND OF THE INVENTION

1. Field of the Invention

The present invention relates to connecting hardware in computer systems, such as connecting a daughter card to a motherboard.

2. Background of the Related Art

An electrical connector is a device for connecting two electrical circuits. An electrical connector is typically designed to mate with a second electrical connector of corresponding type. Mating electrical connectors typically include both a physical interface and an electrical interface. The physical interface allows the mating connectors to be physically connected, and later separated nondestructively. For example, the physical interface may include a plug provided by one connector for physically connecting by friction-fit to a socket provided by the mating connector. The electrical interface typically includes a plurality of electrical contacts or terminals on each of the mating connectors. The act of physically connecting the two mating connectors often simultaneously brings the corresponding electrical contacts of the mating connectors into contact with one another. However, for some types of connectors, such as some "zero insertion force" connectors known in the art, the mating connectors may be physically connected in one step and electrically connected in a subsequent step.

In computer systems, connectors are used to connect hardware devices, such as to connect a daughter card with a motherboard. Many different electrical connectors are available for use with computer systems. The type of connector used may be selected according to the desired orientation of the two devices to be connected. For example, a mezzanine connector is typically used to connect a daughter card to a motherboard with the daughter card oriented parallel to the motherboard. By contrast, a DIMM (dual in-line memory module) is typically connected at an angle to a motherboard using a DIMM connector. Mezzanine connectors and DIMM connectors are two examples of rigid connectors, typically used for connecting two hardware devices with a fixed orientation.

The development of system architecture for a computer system includes the selection of hardware components and the manner in which the components will be interconnected. It is generally desirable to achieve a computer system architecture that is compact and efficient, and yet easy to assemble and service. The selection of hardware and how the hardware is to be interconnected, therefore, affects the level of optimization that can be achieved.

BRIEF SUMMARY OF THE INVENTION

In one embodiment of the present invention, a computer system includes a blade computer having a motherboard. The motherboard has a mezzanine type connector oriented perpendicular to the motherboard. The computer system further includes a daughter card having a card edge with a plurality of card edge contacts and a mezzanine connector configured for mating with the mezzanine connector on the motherboard. An interposer is mounted on the motherboard. The interposer includes a card edge connector and a midplane connector in communication with the card edge connector. The card edge connector includes a socket for receiving the card edge of the daughter card with the daughter card at an acute angle to the motherboard. The card edge connector allows rotation of the card about the received card edge. The mezzanine connectors are aligned for connection in response to rotation of the daughter card about the received card edge.

Another embodiment of the invention provides a blade computer system. The blade computer system includes a multi-blade chassis. The chassis includes multiple bays and a midplane having a plurality of rigid connectors at each bay. Each bay is for receiving a blade computer. The blade computer system includes a plurality of blade computers, each having a motherboard, a mezzanine type connector oriented perpendicular to the motherboard, and a daughter card. The daughter card has a card edge with a plurality of card edge contacts and a mezzanine connector configured for mating with the mezzanine connector on the motherboard. An interposer mounted on the motherboard includes a card edge connector oriented parallel to the motherboard and a midplane connector in communication with the card edge connector. The card edge connector includes a socket for receiving the card edge of the daughter card with the daughter card at an acute angle to the motherboard, and for allowing rotation of the card about the received card edge. The mezzanine connectors are aligned for connection in response to rotation of the daughter card about the received card edge.

DETAILED DESCRIPTION OF THE INVENTION

Figure 1:
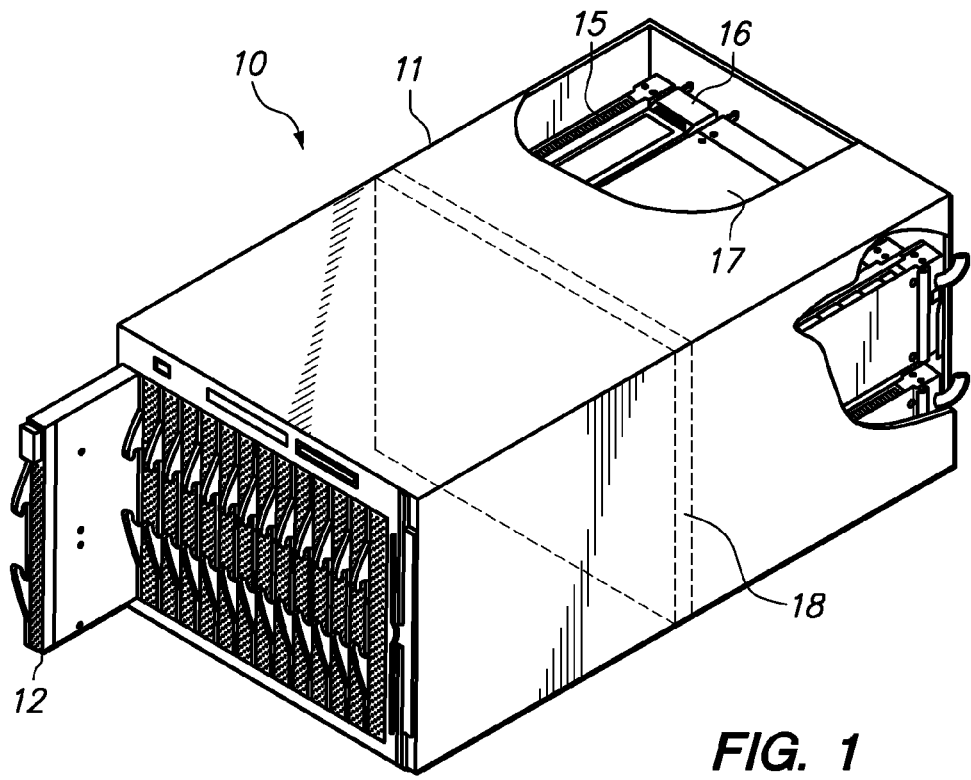
FIG. 1 is a perspective view of an example blade server system including a plurality of blade servers removably installed in a rack-mountable, blade server chassis.

One embodiment of the invention discussed herein provides a novel "insert-and-rotate" connection (alternatively referred to as an "INSAROT" connection) for connecting a daughter card to a blade computer. The daughter card may be, for example, a high-speed daughter card (HSDC) in the form of an I/O card providing one or more Ethernet or fiber channel ports for the blade computer to interface with other computer blades in a multi-blade chassis. In such an example, a mezzanine connector is provided on the motherboard of the blade computer, and is oriented perpendicular to the motherboard. A mating mezzanine connector on the daughter card is oriented perpendicular to the daughter card, and is spaced from a card edge of the daughter card. An interposer mounted on the motherboard, or otherwise secured to the blade chassis, provides a novel edge connector for receiving the card edge.

The card edge may be initially received by the edge connector with the daughter card positioned at an acute angle to the motherboard. The daughter card may then be rotated relative to the edge connector to connect the mezzanine connector on the daughter card with the mezzanine connector on the motherboard in a direction approximately perpendicular to the motherboard. This rotation also puts the daughter card in a position substantially parallel to the motherboard and brings electrical contacts on the card edge into operable engagement with electrical contacts in the card edge connector, wherein the daughter card is then electrically connected to the card edge connector. When the blade computer is subsequently inserted into a bay of the chassis, the interposer plugs into the midplane of a chassis, allowing the blade computer and the included daughter card to interface (hot plug) with other blade computers and support modules in the chassis.

In the present context, a blade computer is a computer that is specifically configured to interface with other blade computers in a chassis as part of a multi-blade computer system. Each blade computer includes at least a motherboard having a processor and system RAM (random-access memory). A blade computer may also include other computer system components, such as a non-volatile storage medium in the form of a hard drive or solid-state drive, a graphics subsystem for generating graphical output, and one or more daughter cards or expansion cards. A distinguishing feature of a blade computer is that the blade computer lacks sufficient on-board resources, such as power and cooling, for the blade computer to function separately from the blade computer system. This feature distinguishes blade computers from personal computers (PCs) and other computers that can function independently, by having an on-board power supply, cooling fan, and so forth. Blade computers instead share resources such as power, cooling, and network connectivity, which is provided by support modules (e.g. power modules, blower modules, and switch modules) installed within a multi-blade chassis. Examples of blade computers include blade servers, PC blades, and workstation blades. Blade servers are emphasized by way of example in the embodiments described below, although one skilled in the art would be able to implement the present connectors and systems in other types of computers.

FIG. 1 is a perspective view of an example blade server system 10 including a plurality of blade servers 12 removably installed in a rack-mountable blade server chassis 11. The blade server chassis 11 has, by way of example, fourteen server bays for receiving fourteen blade servers 12. The blade servers 12 share system resources such as power, cooling, and network connectivity provided by various chassis support modules. The chassis support modules include at least one each of a chassis management module 15, a power supply module 16, and a blower module 17. The management module 15 manages the hardware installed in the chassis 11, including the blade servers 12, power supply module 16, and blower module 17. The power module 16 provides electrical power to all of the blade servers 12. The blower module 17 generates airflow through the chassis 11 to remove the heat generated by each of the servers 12 and support modules. The blade servers 12 and support modules 15-17 interface with one another within the blade server chassis 11 by virtue of their connection with a chassis midplane 18. The midplane 18 has rigid connectors with which the servers and support modules may blind-dock (See FIG. 3). Cable connections may also be made within the blade server chassis 11, although the midplane 18 desirably reduces or eliminates many cabling requirements.

Figure 2:
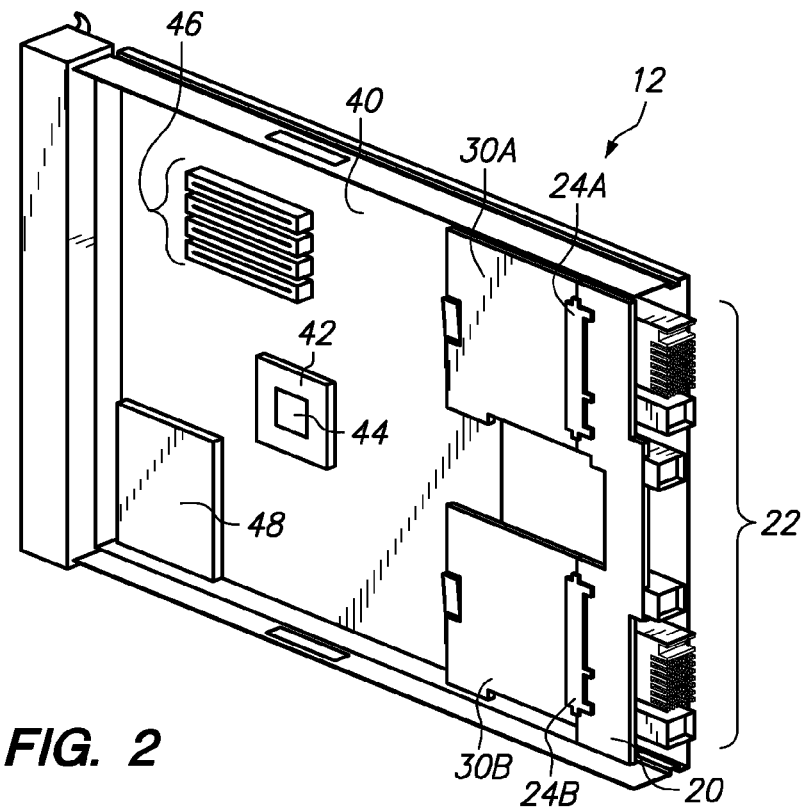
FIG. 2 is a perspective view of one blade server with two daughter cards connected according to an embodiment of the invention.

FIG. 2 is a perspective view of one blade server 12 with two daughter cards 30A, 30B connected according to an embodiment of the invention. Selected components of the blade server 12 are illustrated for discussion, while other components are omitted from the figure for clarity. The components of the blade server 12 include a motherboard 40, with a CPU package 42, multiple DIMMs 46 mounted to the motherboard 40, and a hard drive 48. The CPU package 42 includes a processor or central processing unit (CPU) 44. The CPU 44 processes instructions in the form of computer-executable program code that may be loaded from non-volatile memory provided by the hard drive 48 or volatile memory provided by the DIMMs 46.

Each daughter card 30A, 30B is connected to the motherboard 40 using mating mezzanine connectors provided on each daughter card 30A, 30B and the motherboard 40. Mezzanine connectors are typically used to connect one circuit board (in this case, the daughter card 30) with another circuit board (in this case, the motherboard 40), with the two circuit boards positioned in a parallel orientation. The mezzanine connectors may be, for example, gigarray type connectors known in the art for their use outside the present invention. As used herein, the orientation of a connector refers to the direction in which one connector connects to a mating connector. In this example, the mezzanine connectors are oriented perpendicular to the daughter card 30 and the motherboard 40. The perpendicular orientation allows the daughter card 30 and motherboard 40 to be connected in a parallel orientation. The unique manner in which the daughter card connects to the motherboard 40 using mezzanine connectors in this embodiment will be further discussed with reference to FIGS. 5 and 6.

The blade server 12 also includes a novel, two-position interposer 20 mounted to the blade server 12 for connecting the blade server 12 to a midplane within a blade server chassis. Each daughter card 30A, 30B is connected to the interposer 20 along an edge of the daughter cards 30A, 30B using respective card edge connectors 24A, 24B provided on the interposer 20. The interposer may be regarded as a secondary daughter card. The interposer 20 also provides a plurality of midplane connectors 22 that connect to the midplane of the chassis so that the blade server 12 may interface with other blade servers. In a particular example application, the daughter cards 30A, 30B are input/output (I/O) cards, providing network connectivity between the blade server 12 and the other blade servers and support modules. The connection of a daughter card to a card edge connector on the interposer 20 is also discussed further below.

The interposer 20 is illustrated as being a two-position interposer for connecting two daughter cards. However, an interposer for connecting a different number of daughter cards in the manner described herein is also within the scope of the invention. For example, a single-position interposer may be provided in one embodiment allowing only for connecting a single daughter card. Another embodiment may provide a multi-position interposer capable of connecting more than two daughter cards. Also, it should be noted that the interposer may allow different types of daughter cards to be used simultaneously. For example, an Ethernet card may be provided at one position having a plurality of Ethernet ports, and a fiber channel card may be provided at another position having a plurality of fiber channel ports.

Figure 3:
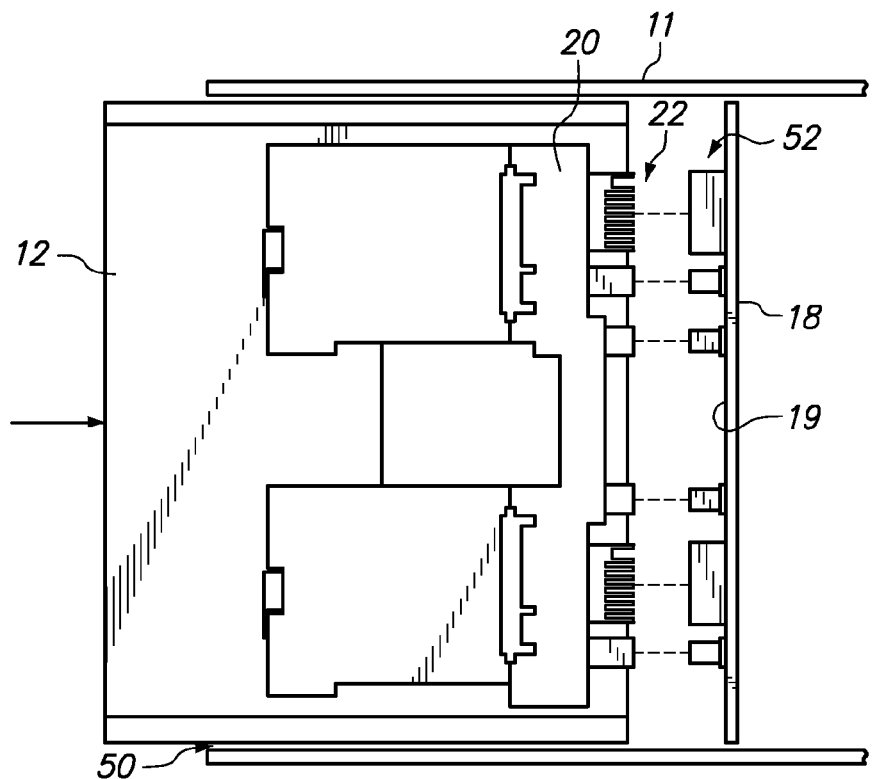
FIG. 3 is a side view of the blade server of FIG. 2, illustrating the connection of the blade server with the midplane inside the chassis.

FIG. 3 is a side view of the blade server 12 of FIG. 2, illustrating the connection of the blade server 12 with the midplane 18 inside the chassis 11. The blade server 12 is physically inserted into a bay 50 provided within the chassis 11. The chassis 11 includes additional bays (not shown) for receiving additional blade servers. The bay 50 is sized to receive the blade server 12 with close enough tolerances to guide the midplane connectors 22 on the back of the blade server 12 into connection with corresponding connectors 52 on a surface 19 of the midplane 18. This guided insertion and connection is referred to as blind-docking. As the blade server 12 is urged into the bay 50, typically, by hand, and/or using a lever, the blade server 12 is moved toward the surface 19 provided on the midplane 18, until the connectors 22 on the end of the blade server 12 mate with the corresponding connectors 52 on the midplane 18.

System software known in the art allows the blade server 12 to hot plug into the blade server system or to otherwise be hot-swapped. Hot swapping and hot plugging are terms used to separately describe the functions of replacing system components without shutting down the system. Hot swapping describes changing components (in this case, the blade server 12) without significant interruption to the rest of the (blade server) system, while hot plugging describes changing or adding components which interact with the operating system.

Figure 4:
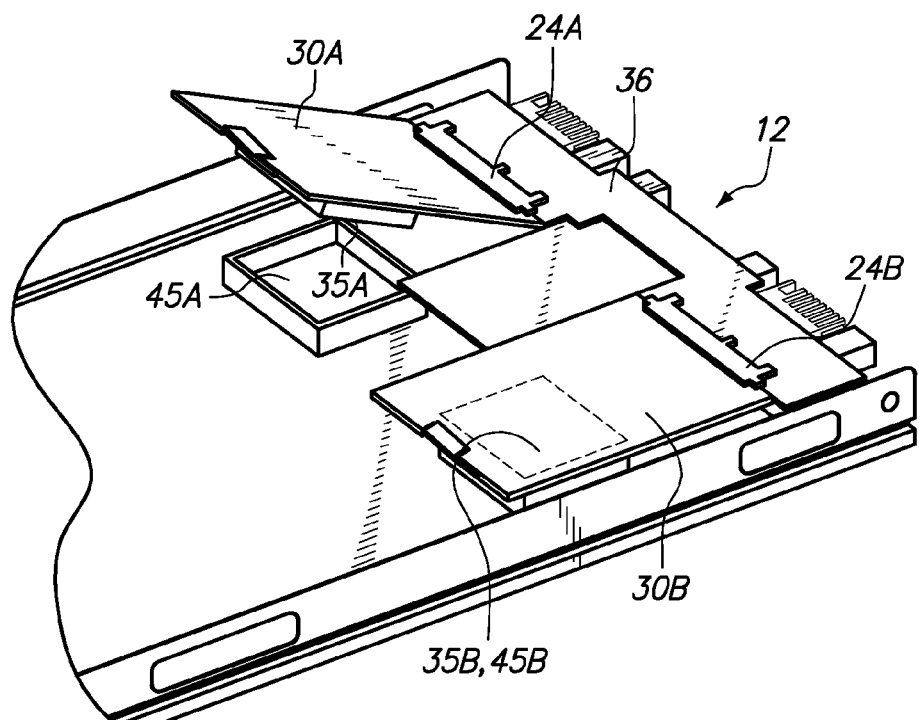
FIG. 4 is a perspective view of the blade server showing the first daughter card partially installed to the blade server and with the second daughter card fully installed to the blade server.

FIG. 4 is a perspective view of the blade server 12 showing the first daughter card 30A in an inserted position and showing the second daughter card 30B in an inserted and rotated position. More particularly, the first daughter card 30A has been inserted into the card edge connector 24A provided by the interposer 20. The daughter card 30A is considered only partially installed in this position, as the daughter card 30A has not yet been rotated to connect the mezzanine connector 35A on the daughter card 30A with the mezzanine connector 45A on the motherboard 40, and to engage electrical card edge contacts of the daughter card 30A with corresponding electrical socket contacts within the card edge connector 24A. The second daughter card 30B has been inserted into the corresponding card edge connector 24B and subsequently rotated to connect the corresponding mezzanine connectors 35B, 45B and to engage the corresponding card edge contacts and socket contacts.

Figure 5:
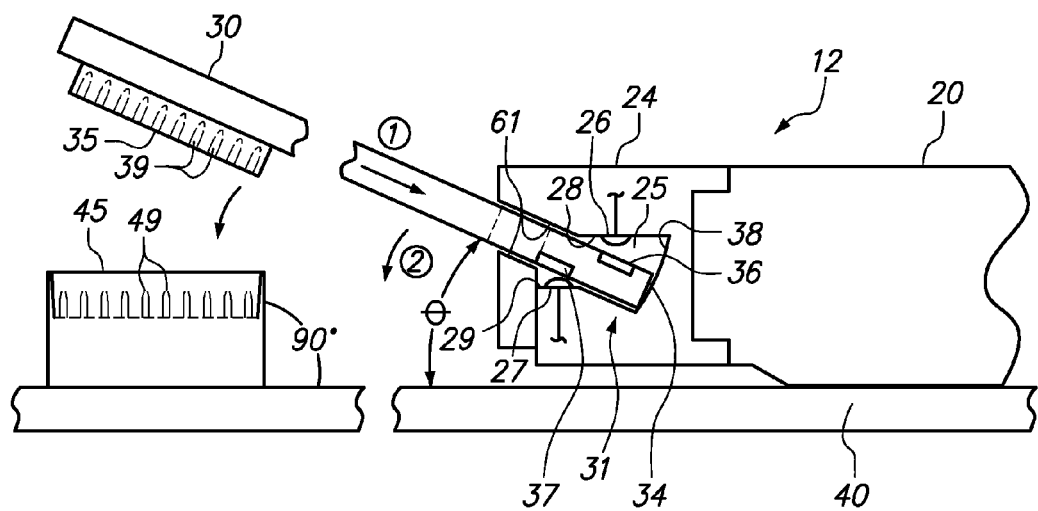
FIG. 5 is a side view of a portion of the blade server partially installed with an edge of the daughter card initially inserted into the edge connector on the interposer.
Figure 6:
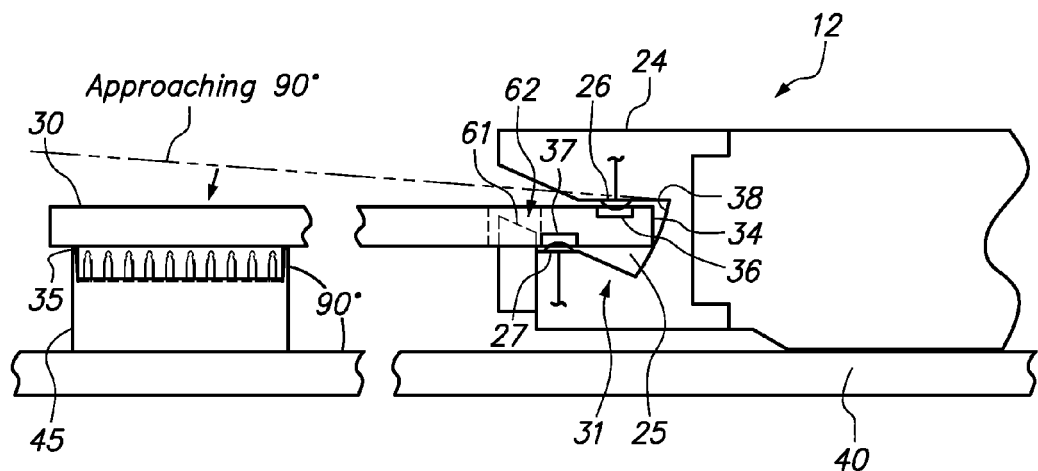
FIG. 6 is a schematic side view of the daughter card rotated about the card edge from the acute angle θ of FIG. 5 to a parallel orientation with the motherboard.

FIGS. 5 and 6 are side views sequentially illustrating the installation of a daughter card 30 with the blade server 12. FIG. 5 illustrates the "insert" aspect of the insert-and-rotate (INSAROT) connection, wherein a card edge 31 is first inserted into a card edge connector 24 on the interposer 20. FIG. 6 illustrates the subsequent "rotate" aspect of the insert-and-rotate connection, wherein the daughter card 30 is rotated to connect the mezzanine connector 35 on the daughter card 30 with the mezzanine connector 45 on the motherboard 40, and to electrically connect the card edge 31 with the card edge connector 24. Accordingly, in FIG. 6 the daughter card 30 has been physically installed.

Referring first to FIG. 5, the card edge 31 has a plurality of card edge contacts, including a first row of card edge contacts 36 provided along one face of the daughter card 30 and a second row of card edge contacts 37 provided along an opposing face of the daughter card 30. The rows of card edge contacts 36, 37 are aligned into the page so that only the outermost contact is visible; however, one skilled in the art will understand the general orientation of a row of contacts as illustrated. The card edge connector 24 includes a socket 25 for receiving the card edge 31. The socket 25 includes a first wall 28 and an opposing second wall 29 facing the first wall 28. A first row of socket contacts 26 is provided on the first wall 28 and a second row of socket contacts 27 are provided on the second wall 29. The first row of socket contacts 26 is staggered from the second row of socket contacts 27—specifically, with respect to the view of FIG. 5, the first row of socket contacts 26 is staggered to the right of the second row of socket contacts 27. The first row of card edge contacts 36 is similarly staggered from the second row of card edge contacts 37 such that the first row of card edge contacts 36 will align with the first row of socket contacts 26 and the second row of card edge contacts 37 will align with the second row of socket contacts 27. A first mezzanine connector 35 provided on the daughter card 30 is oriented perpendicular to the daughter card 30. A second mezzanine connector 45 provided on the motherboard 40 is oriented perpendicular to the motherboard 40. The first mezzanine connector 35 includes a plurality of electrical contacts 39 that correspond in relative position to a plurality of electrical contacts 49 of the mezzanine connector 45 on the motherboard 40.

The socket 25 of the card edge connector 24 includes a pair of downwardly sloping surfaces 61 at the entrance, requiring the daughter card 30 to be initially inserted at an acute angle θ with respect to the motherboard 40. The angle θ of the daughter card 30 initially keeps the first and second rows of card edge contacts 36, 37 separated from the first and second rows of socket contacts 26, 27. The angle θ of the daughter card 30 also initially keeps the two mezzanine connectors 35, 45 separated from one another, which allows the card edge 31 to first be inserted into the card edge connector 24 without interference between the two mezzanine connectors 35, 45. The first row of card edge contacts 36 will contact the first row of socket contacts 26 and the second row of card edge contacts 37 will contact the second row of socket contacts 27 of corresponding position when a second end of the daughter card 30 is subsequently rotated downward.

The socket 25 includes a back wall 38 that limits insertion of the daughter card 30. An end 34 of the card contacts the back wall 38 upon full insertion, providing tactile feedback to a user installing the daughter card 30 that the daughter card 30 has been fully inserted. The back wall 38 also positions the daughter card 30 so that subsequent rotation of the daughter card 30 will cause the card edge contacts 36, 37 to contact the socket contacts 26, 27.

FIG. 6 is a schematic side view of the daughter card 30 rotated about the card edge 31 from the acute angle θ of FIG. 5 to a parallel orientation with the motherboard 40. A relief portion 62 is provided on the daughter card 30 in proximity to the card edge 31, but without interfering with the card edge contacts 36, 37. The relief portion 62 may be, for example, a through-hole in the daughter card 30. The relief portion 62 aligns with the lower downwardly sloping surface 61 when the daughter card 30 is fully inserted into the socket 25 (i.e. when the end 34 of the daughter card 30 contacts the back wall 38), so that the daughter card 30 may be rotated downward. In response to this rotation of the daughter card 30, the first row of card edge contacts 36 make electrical contact with the first row of socket contacts 24, and the second row of card edge contacts 37 make electrical contact with the second row of socket contacts 27. Simultaneously, rotation of the daughter card 30 to the parallel orientation connects the mezzanine connectors 35, 45, with the electrical contacts 39 on the first mezzanine connector 35 making electrical contact with the electrical contacts 49 having corresponding positions on the second mezzanine connector 45.

As the daughter card 30 is rotated from the acute angle θ of FIG. 5 to the parallel position of FIG. 6, the two mezzanine connectors 35, 45 initially contact each other when the daughter card 30 is already nearly parallel to the motherboard. With the daughter card 30 nearly parallel to the motherboard 40, the mezzanine connectors 35, 45 are sufficiently aligned for connecting, with the relative movement of the upper mezzanine connector 35 being nearly perpendicular to the motherboard 40 and the relative position of the lower mezzanine connector 45 being nearly perpendicular to the daughter card 30. This movement, coupled with the perpendicular orientation of the mezzanine connector 35 with respect to the daughter card 30 and the perpendicular orientation of the mezzanine connector 45 with respect to the motherboard 40 allows the two mezzanine connectors 35, 45 to mate.

Figure 6A:
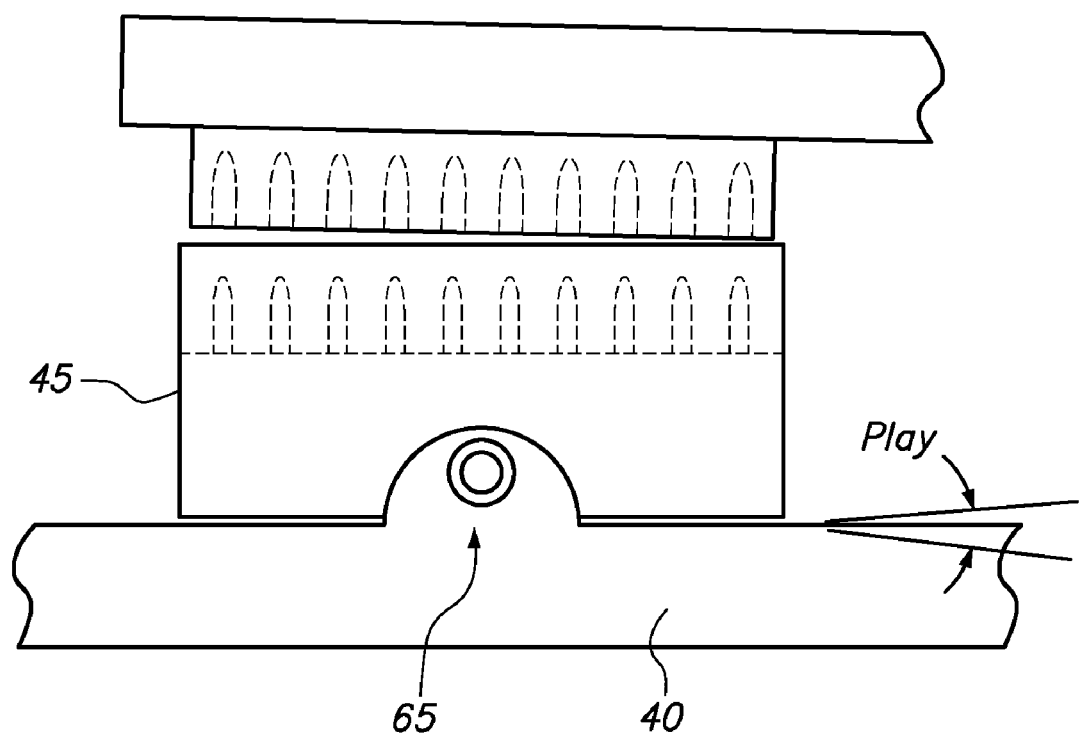
FIG. 6A is a side view of an alternate configuration of a mezzanine connector that is pivotably coupled to the motherboard to facilitate connection with the mezzanine connector on the daughter card.

However, because the daughter card 30 and motherboard 40 may not be perfectly parallel when the mezzanine connectors 35, 45 initially contact one another, the manufacturing tolerances of the mezzanine connectors 35, 45 may affect the ease with which the two mezzanine connectors 35, 45 mate in this embodiment. FIG. 6A, therefore, shows an alternate configuration wherein the mezzanine connector 45 is pivotably coupled to the motherboard 40 using a pivotable coupling 65, which may be useful for instances wherein the tolerances of the two mezzanine connectors 35, 45 is particularly close. The pivotable coupling allows the mezzanine connector 45 to pivot slightly to more closely align with the other mezzanine connector 35 when brought into initial engagement.

In the above-described example embodiments, the daughter cards are I/O cards. However, one skilled in the art will appreciate that daughter cards of other types may alternatively be connected in the above-described manner. For example, a daughter cards may include other types of expansion cards, which are pluggable circuit boards including hardware and/or firmware that either expands on features offered by a motherboard or provides additional features not offered by the motherboard. Common examples of expansion cards suitable for use with the invention include Ethernet and fiber channel cards.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer system, comprising:
   a computer including a motherboard, the motherboard including a mezzanine type connector oriented perpendicular to the motherboard;
   a daughter card having a card edge with a plurality of card edge contacts and a mezzanine connector configured for mating with the mezzanine connector on the motherboard; and
   an interposer mounted on the motherboard, the interposer including a card edge connector and a midplane connector in communication with the card edge connector, the card edge connector including a socket for receiving the card edge of the daughter card with the daughter card at an acute angle to the motherboard, and for allowing rotation of the card about the received card edge, the mezzanine connectors being aligned for connection in response to rotation of the daughter card about the received card edge.

2. The computer system of claim 1, further comprising:
   a first row of card edge contacts along one face of the daughter card and a second row of card edge contacts on an opposing face of the daughter card, wherein the first row of card edge contacts is staggered with respect to the second row of card edge contacts; and
   the socket defining a first wall and an opposing second wall facing the first wall, the card edge connector further including a first row of socket contacts on the first wall and a second row of socket contacts on the second wall, the second row of socket contacts being staggered with respect to the first row of socket contacts such that the first row of card edge contacts engages the first row of socket contacts and the second row of card edge contacts engages the second row of socket contacts in response to the rotation of the card about the received card edge.

3. The computer system of claim 1, wherein the socket further comprises a downwardly sloping portion for guiding the daughter card at the acute angle upon initial insertion of the card edge into the socket.

4. The computer system of claim 3, further comprising a relief portion allowing the rotation of the daughter card when the relief portion is aligned with the downwardly sloping portion.

5. The computer system of claim 1, further comprising
   a second daughter card having a card edge with a plurality of card edge contacts and a second mezzanine connector configured for mating with a second mezzanine connector on the motherboard; and
   wherein the interposer includes a second card edge connector oriented parallel to the motherboard, the second card edge connector including a socket for receiving the card edge of the second daughter card with the second daughter card at an acute angle to the motherboard, and for allowing rotation of the card about the received card edge, the second mezzanine connectors being aligned for connection in response to rotation of the second daughter card about the received card edge.

6. The computer system of claim 1, wherein the daughter card comprises a network card having one or more Ethernet ports or one or more fiber channel ports.

7. The computer system of claim 1, wherein the mezzanine connectors are gigarray-type connectors.

8. The computer system of claim 1, further comprising a pivotable coupling, wherein the mezzanine connector on the motherboard is pivotably connected to the motherboard with the pivotable coupling.

9. A blade computer system, comprising:
   a multi-blade chassis including multiple bays and a midplane having a plurality of rigid connectors at each bay, each bay for receiving a blade computer;
   a plurality of blade computers, each blade computer including a motherboard, with a mezzanine type connector oriented perpendicular to the motherboard, a daughter card having a card edge with a plurality of card edge contacts and a mezzanine connector configured for mating with the mezzanine connector on the motherboard, and an interposer mounted on the motherboard, the interposer including a card edge connector oriented parallel to the motherboard and a midplane connector in communication with the card edge connector, the card edge connector including a socket for receiving the card edge of the daughter card with the daughter card at an acute angle to the motherboard, and for allowing rotation of the card about the received card edge, the mezzanine connectors being aligned for connection in response to rotation of the daughter card about the received card edge.

10. The blade computer system of claim 9, wherein the daughter card of each computer blade comprises a network card having one or more Ethernet ports or one or more fiber channel ports for communicating with the other computer blades.

11. The blade computer system of claim 9, wherein each blade computer further comprises:
a first row of card edge contacts along one face of the daughter card and a second row of card edge contacts on an opposing face of the daughter card, wherein the first row of card edge contacts is staggered with respect to the second row of card edge contacts; and
the socket defining a first wall and an opposing second wall facing the first wall, the card edge connector further including a first row of socket contacts on the first wall and a second row of socket contacts on the second wall, the second row of socket contacts being staggered with respect to the first row of socket contacts such that the first row of card edge contacts engages the first row of socket contacts and the second row of card edge contacts engages the second row of socket contacts in response to the rotation of the card about the received card edge.

12. The blade computer system of claim 9, wherein each socket further comprises a downwardly sloping portion for guiding the daughter card at the acute angle upon initial insertion of the card edge into the socket.

13. The blade computer system of claim 12, further comprising a relief portion on each daughter card allowing the rotation of the daughter card when the relief portion is aligned with the downwardly sloping portion.

* * * * *